July 23, 1935. J. H. HAMMOND, JR., ET AL 2,008,710
DYNAMIC MULTIPLIER
Filed Feb. 4, 1933
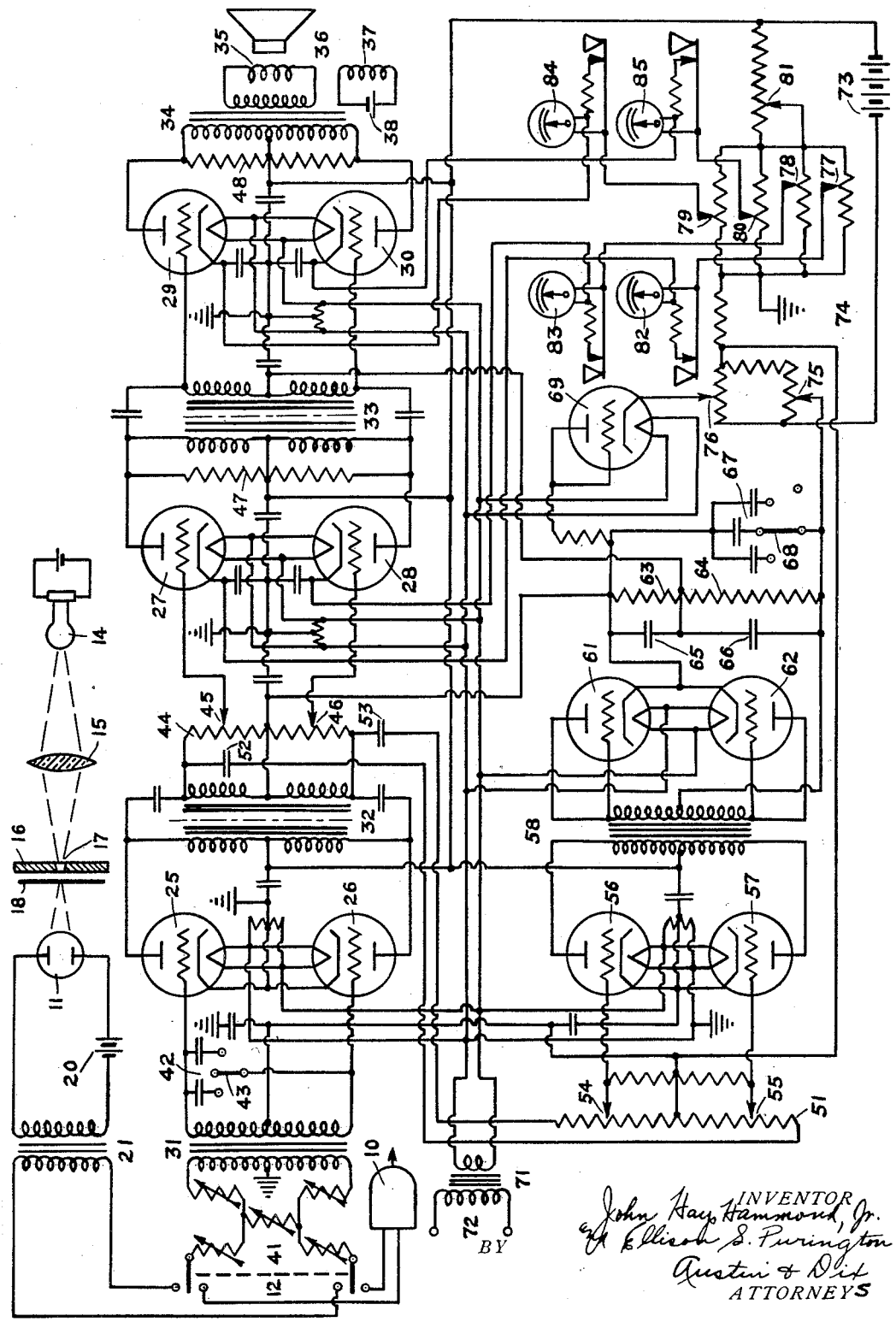
INVENTOR
John Hays Hammond, Jr.
Ellison S. Purington
BY Austin & Dix
ATTORNEYS Patented July 23, 1935

2,008,710

UNITED STATES PATENT OFFICE 2,008,710

DYNAMIC MULTIPLIER

John Hays Hammond, Jr., and Ellison S. Purington, Gloucester, Mass.; said Purington assignor to said John Hays Hammond, Jr.

Application February 4, 1933, Serial No. 655,176

24 Claims. (Cl. 179—100.4)

This invention relates to an automatic control system and more particularly to a system for automatically controlling the amplification of an electron discharge amplifier in accordance with the amplitude of the signal being translated.

This invention is particularly applicable to pick-up devices, such as a phonograph pick-up or a photo-electric pick-up, and to an amplifying system for amplifying the signals picked up and applying them to a sound propagating device, such as a loud speaker.

The present invention provides for controlling the operating characteristics in accordance with the strength of the applied signal so that the amplifying efficiency of the system is greater for strong signals than for weak signals.

One of the purposes of the invention is to provide means for independently adjusting the cathode potentials of the individual space discharge devices in the amplifier.

Another feature of the invention is the use of multiple range meters whereby the adjustments of the gain ratio of the amplifier may be accurately made.

The invention further provides for the use of push-pull amplification and other arrangements to eliminate from the amplifier out-put any desired signal, such as low audible tones in the control current.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which the single figure of the drawing illustrates diagrammatically the system as applied to the reproduction of the sound record of a talking moving picture projector or phonograph.

In the following description and in the claims, parts will be identified by specific names for convenience, but they are intended to be as generic in their application to similar parts as the art will permit.

Referring to the drawing more in detail, an amplifying system is shown as applied to a phonograph pick-up 10 or a photo-electric pick-up comprising photo-electric cell 11 to which the amplifier may be selectively connected by double pole double throw switch 12.

The photo-electric pick-up includes a source of light 14, lens 15, aperture plate 16, having an aperture 17 therein, and photographic sound record or film 18, the above elements being arranged so that light rays from source 14 are focused by means of lens 15 through aperture 17 onto the photographic sound record and are then used to actuate photo-electric cell 11. Said cell is energized by a suitable source of potential 20 and is connected through transformer 21 with switch 12.

The amplifier is disclosed as comprising three stages of push-pull amplification including electron discharge devices 25, 26, 27, 28, 29 and 30 and coupling devices 31, 32, 33 and 34 to which said devices are connected in a manner well known in the art. Devices 25 and 26 constitute a preliminary amplifier while devices 27, 28, 29 and 30 constitute controller amplifiers. The secondary of transformer 34 is connected to the armature coil 35 of a loud speaking device 36 which may have a stationary field coil 37 energized by battery 38. If found desirable, a power amplifier (not shown) may be inserted between the coupling device 34 and the loud speaker 35.

An attenuator 41 comprising five variable resistances is connected across the input circuit of the transformer 31 and a bank of condensers 42 controlled by a switch 43 is connected across the output circuit of this transformer. A resistance 44 is connected across the output circuit of the coupling device 32 and is provided with two adjustable contacts 45 and 46, which are connected in the input circuits of the devices 27 and 28. These contacts are preferably interconnected mechanically, so that they operate together so that when energy applied to device 27 is increased, the energy applied to device 28 is also increased. Two resistances 47 and 48 are connected across the input circuits of the coupling devices 33 and 34 respectively, as shown.

For controlling the gain ratio of amplifiers 27, 28, 29 and 30 a resistance 51 is connected through two condensers 52 and 53 to the output circuit of the coupling device 32. This resistance is provided with two adjustable contacts 54 and 55, which are connected in the input circuits of two space discharge control devices 56 and 57 forming a stage of push-pull amplification. The output circuit of the control devices 56 and 57 is connected through a transformer 58 to a pair of rectifiers 61 and 62. Connected across the output circuit of these rectifiers is a resistor assembly 63, 64, which is shunted by condensers 65 and 66 and a bank of condensers 67, which are controlled by a switch 68. A unidirectional conducting device 69 has its input circuit connected to one end of the resistor assembly 63, 64, and operates as a limiter.

All the space discharge devices are supplied with filament current from a transformer 71, the primary of which is connected to a source of A. C. supply 72, and with plate potential from a battery 73, which is connected across a resistor assembly 74 provided with adjustable contacts 75—81. Any D. C. source of plate power may be substituted for the battery.

The contact 75 is connected to one end of the resistor assembly 63, 64 and determines the initial bias on controlled space discharge devices 27, 28, 29 and 30 and on rectifiers 61 and 62. The contact 76 determines the cathode potential on the limiter 69. The contacts 77 to 80 determine the cathode potentials on the devices 27, 28, 29 and 30.

Multiple range meters 82 to 85 are connected in the cathode circuits of the devices 27 to 30 for measuring the currents taken by these devices. Key operated shunts are provided in connection with these meters for increasing their sensitivity.

In the operation of the circuit above described, electrical tonal energy is produced at the electrical tonal source 10 or 11, properly adjusted as to volume by attenuator 41, and as to passage of high frequency tones by filter condenser 42, and fed to the grids of preliminary amplifiers 25 and 26. The amplified energy from electron discharge devices 25 and 26 is fed to the succeeding circuits by coupling device 32, which is shown as a double impedance coupler, with plate windings for electron discharge devices 25 and 26 on the same magnetic iron core and grid windings for electron discharge devices 27, 28, 56 and 57 on another single magnetic core. The two cores of the coupler 32 are entirely separate and their magnetic circuits are not linked together in any way. Part of the output energy from coupler 32 is fed to the controlled amplifier electron discharge devices 27 and 28, and part to the controlling amplifier electron discharge devices 56 and 57 with individual volume controls 45, 46, 54 and 55 for controlling the amount and ratio of the energies to the two amplifiers 27, 28 and 56, 57 respectively.

Energy amplified by control amplifiers 56 and 57 is rectified by electron discharge devices 61 and 62 in a full wave rectification arrangement, producing rectified output current through control resistors 63 and 64 varying in accordance with the average strength characteristics of signals impressed on the system from the source 10 or 11. The voltage developed across these resistors is utilized to control the bias and therefore the amplifying ability of electron discharge devices 27, 28, 29 and 30, and the connections are such that increased signal decreases the bias values.

The output energy from controlled electron discharge devices 27 and 28 is delivered by coupler 33 to controlled amplifier 29 and 30, and the output energy from electron discharge devices 29 and 30 is delivered to the succeeding utilization circuit by output coupler 34.

Couplers 33 and 34 are provided with equalizer resistors 47 and 48 across the input windings, since they derive energy from electron discharge devices which are varied in impedance in accordance with signal strength. Similar resistors are not required across primary of coupling device 32, as the electron discharge devices 25 and 26 operate with substantially fixed bias with internal impedance which is independent of signal strength. Resistors 47 and 48 serve to make the frequency characteristics of the controlled stages more nearly independent of gain characteristics.

Couplers 33 and 34 also are provided with windings for both sides of the balanced circuit on the same magnetic core, so that with the plate currents of the controlled electron discharge devices changing in accordance with the bias control voltage there is no change of electromagnetic energy of the core due to the controlling tubes, and consequently no time lag due to reactive voltage across the windings to retard the speed of control action. It will be understood that the magnetic circuits of the separate iron cores of coupler 33 are not linked.

It will be observed that the system as a whole between primary of transformer 31 and secondary of transformer 34 is a push-pull system, which tends to eliminate even harmonics representing distortion of the applied signal produced by tube curvature of characteristics. In addition the use of reactors with separate magnetic cores on the plate and grid sides of couplers 32 and 33 minimizes the transfer of even harmonic energy produced by tube distortions, which would occur if four individual reactors were used for each coupler. The transfer of this harmonic energy is minimized by the current to each tube inducing voltage into the coupling winding of its companion tube with additive effects for fundamental, but subtractive effect for the harmonics caused by distortions. With close coupling between both plate windings the coupler neutralizes transmission of distortion harmonics to practically the same degree as a push-pull coupling transformer having separate primary and secondary windings, as for example coupler 34.

It will be observed that the main purpose of the push-pull design for usual sound systems is to improve tonal transmission by elimination of harmonics and other tones produced by tube action and not originally present at the input. In dynamic multipliers for sound systems, however, it is also used because it permits speedier control action, first directly, because inductive lags in output coupling devices due to the sudden changes in plate current are eliminated, and secondly indirectly, because low frequency audible tones produced by the high speed control action and inserted into the grid return circuit of the controlled tubes are balanced out from passing through the amplifier in a manner similar to the balancing of distortion tones.

One difficulty which is met in operation of dynamic multipliers has been in replacement of tubes, due to lack of uniformity of characteristics. The present invention provides for adjustments which may be made on installing tubes, so that the operation may be well balanced over the operating ranges.

The battery or equivalent power source in addition to feeding the plate circuits of the tubes, feeds a resistance network including variable resistor 81, the four cathode potentiometers 77, 78, 79 and 80 in parallel on the positive side of ground, and potentiometers 75 and 76 on the negative side of ground. Tap on potentiometer 75 determines the bias on electron discharge devices 27, 28, 29 and 30 with respect to ground in the absence of tonal signal and with no control current passing through resistors 63 and 64. However, the anode current flow through the electron discharge devices is determined not by bias and plate voltage with respect to ground, but by bias and plate voltage with respect to the cathode. Accordingly for adjustment purposes the cathodes of the electron discharge devices 27, 28, 29 and 30 are connected to adjustable contacts on potentiometers 77, 78, 79 and 80 through indicating meters 82, 83, 84, 85. These meters are provided with shunts which are opened by push buttons for increasing the sensitivity for reading low values of cathode current.

In operation, potentiometers 77 and 78 will be adjusted to give substantially equal anode currents in the absence of signal, and potentiometers 79 and 80 to give also equal currents, but the currents to electron discharge devices 27 and 28 may be less than the currents to electron discharge devices 29 and 30 because the former devices are not required to handle so great signal strengths as the latter. When these adjustments are made, it will be found that the plate currents of tubes of a balanced amplifier are substantially alike for all signal strengths, with a much less percentage difference of current and of lack of balance than would occur if both tubes were given the same bias.

Although only a few of the various forms in which this invention may be embodied have been shown herein, it is to be understood that the invention is not limited to any specific construction, but might be embodied in various forms without departing from the spirit of the invention or the scope of the appended claims.

What is claimed is:

1. In a system for producing sound from a sound record, means for altering the dynamic range including a main amplifier with variable gain characteristics, a control amplifier and rectifier for controlling said gain characteristics, and means for obtaining high speed dynamic control action by said control amplifier on said main amplifier and means to prevent the introduction of audio tones from the controlling circuit into the output of the main amplifier.

2. In a system for producing sound from a sound record, means for altering the dynamic range including a main amplifier with variable gain characteristics, using iron cored interstage coupling devices, a control amplifier and rectifier for controlling said gain characteristics, and means for preventing said control rectifier from changing the electromagnetic energy of said iron cored devices.

3. In a system for producing sound from a sound record, a balanced push-pull amplifier stage of amplification using impedance couplings, with plate windings for the individual tubes of the balanced arrangement wound on the same magnetic core, in such a manner that the output stage tends to be non-responsive to harmonics produced by tube distortions, or to sudden charges of plate currents to the individual tubes.

4. In a system for producing sound from a sound record, means for altering the dynamic range including a main amplifier with variable gain characteristics using a purality of tubes, a control rectifier for controlling said characteristics, and manual means for individually adjusting the currents through said tubes to predetermined values in the absence of sound signals.

5. In a sound reproducing system, a sound record, a pick-up device therefor, a dynamic amplifier fed by said pick-up device and comprising a plurality of tubes, means for adjusting the static control electrode potential of said tubes to predetermined given values and separate means for separately adjusting the static potential on the cathodes of said tubes after the static potential of the control electrodes has been adjusted.

6. In a sound reproducing system, a sound record, a pick-up device therefor, a dynamic amplifier fed by said pick-up device, a sound propagating device fed by said amplifier, said dynamic amplifier comprising a plurality of tubes, separate anode-cathode circuits for adjusting the space current of said tubes, said circuits including separate meters, each meter having means for increasing the range thereof.

7. In a sound reproducing system, a sound record, a pick-up device therefor, a first push-pull amplifier fed by said pick-up device, a second push-pull amplifier fed by said first amplifier, a sound propagating device fed by said second amplifier, separate anode-cathode circuits having means for adjusting the space current of the tubes of said amplifiers with no signal.

8. In a sound reproducing system, a sound record, a pick-up device therefor, a first push-pull amplifier fed by said pick-up device, a second push-pull amplifier fed by said first amplifier, a sound propagating device fed by said second amplifier, separate anode-cathode circuits for adjusting the space current of the tubes of said amplifiers with no signal, said circuits including separate potentiometers and separate meters, each meter having means for increasing the range thereof.

9. In a sound reproducing system, a sound record, a pick-up device therefor, an amplifier comprising first and second stages of push-pull amplification, a double impedance coupler between said stages and means for varying the gain ratio of said amplifier according to the intensity variations on the record.

10. In a sound reproducing system, a sound record, a pick-up device therefor, a lower stage of amplification fed by said pick-up device, an upper stage of amplification fed by said lower stage, a sound propagating device fed by said upper stage, a double impedance coupler between said stages, each said stage comprising a push-pull amplifier, said coupler comprising first and second inductive reactances having their magnetic circuits separate, said first reactance comprising separate windings in the balanced plate circuits of the lower stage push-pull amplifier, said second reactance having separate windings in the balanced input circuits of the upper stage push-pull amplifier, condensers coupling said reactances together, and means fed by said pick-up device for varying the gain ratio of said lower stage according to the moving average intensity of the energy from said pick-up device.

11. In a sound reproducing system, a sound record, a pick-up device therefor, a lower stage of amplification fed by said pick-up device, an upper stage of amplification fed by said lower stage, a sound propagating device fed by said upper stage, a double impedance coupler between said stages, each said stage comprising a push-pull amplifier, said coupler comprising first and second inductive reactances, each reactance having an iron core, said reactances having their magnetic circuits separate, said first reactance comprising separate windings in the balanced plate circuits of the lower stage push-pull amplifier, said second reactance having separate windings in the balanced input circuits of the upper stage push-pull amplifier, condensers coupling said reactances together, and a control circuit fed by said pick-up device for varying the internal impedance of the both push-pull tubes of both stages according to the moving average intensity of the energy from said pick-up device.

12. In a sound reproducing system, a sound record, a pick-up device therefor, a lower stage of amplification fed by said pick-up device, an upper stage of amplification fed by said lower stage, a sound propagating device fed by said upper stage, each said stage comprising a pair of vacuum electron discharge tubes connected in push-pull relation, a source of anode current between the anodes of said tubes and the heater elements of the cathodes of said tubes, a cathode potential adjusting arrangement comprising a common resistance and separate parallel resistances for said amplifier tubes connected in series with said common resistance, said common resistance and separate resistances being placed between said anodes and heater elements, a tap on each of said separate resistances, current measuring meters between said taps and their particular anodes, shunts for said meters to increase their range, a control circuit fed by said pick-up device for varying the bias on the grids of said push-pull amplifier tubes according to the moving average intensity of the energy from said pick-up device.

13. In a sound reproducing system, a sound record, a pick-up device therefor, a lower stage of amplification fed by said pick-up device, an upper stage of amplification fed by said lower stage, a sound propagating device fed by said upper stage, each said stage comprising a pair of vacuum electron discharge tubes connected in push-pull relation, a source of anode current between the anodes and the heater elements for the cathodes of said tubes, a cathode potential adjusting arrangement comprising a common resistance and separate parallel resistances for said amplifier tubes connected in series with said common resistance, said common resistance and separate resistances being placed between said anodes and heater elements, a tap on each of said separate resistances, current measuring meters between said taps and their particular anodes, a control circuit fed by said pick-up device for varying the bias on the grids of said push-pull amplifier tubes according to the moving average intensity of the energy from said pick-up device.

14. In a sound reproducing system for a sound record, the method of balancing a push-pull vacuum tube amplifier which comprises applying the same constant direct current potential to the control elements of both tubes of said amplifier and then adjusting the anode circuits thereof to carry substantially equal direct currents.

15. In a sound reproducing system for a sound record, the method of balancing a push-pull vacuum tube amplifier which comprises applying the same constant direct current potential to the control elements of both tubes of said amplifier, measuring the currents in the anode circuits of said tubes and simultaneously adjusting said circuits until they carry substantially equal direct currents.

16. In a system for reproducing sound from a sound record, a pick-up device, a multi-stage push-pull amplifier fed thereby, a translating device fed by said amplifier, a control channel associated with said amplifier and comprising means for varying the gain ratios of the different stages of said amplifier according to changes in level of the energy transmitted, said means being adapted to vary the gain ratios of the different stages by different amounts.

17. In a sound reproducing system, a sound record, a pick-up device therefor, a dynamic amplifier fed by said pick-up device, a control channel for governing the gain of said amplifier also fed by said pick-up device, said control channel comprising a push-pull amplifier, a full wave rectifier fed by said push-pull amplifier, and a biasing resistance fed by said rectifier, said biasing resistance controlling the bias on the control element of said dynamic amplifier.

18. In a system for reproducing sound, a sound record, a space discharge amplifier, a control circuit for controlling the gain ratio thereof, means for applying an input signal from said record to said amplifier and to said control circuit, whereby the control circuit varies the gain ratio of said amplifier in accordance with the average value of the input signal and means for independently controlling the strength of signal applied to said amplifier and to said control circuit.

19. In a system for reproducing sound from a sound record comprising a plurality of stages of space discharge amplifiers arranged in cascade, a control circuit having an impedance common to said stages, means for passing a current through said impedance proportional to the average value of the input signal and for utilizing the voltage drop in said impedance for controlling the gain ratio of said stages and means for independently adjusting the signal applied to said amplifier and to said control circuit, whereby the signal volume may be adjusted independently of the gain ratio.

20. A system for reproducing sound from a sound record comprising a plurality of stages of amplification connected in cascade, the first of said stages being operated at a lower amplification factor than the second of said stages, a control circuit for varying the amplification factors of said stages in proportion to the average value of the applied signal in such manner that the volume range of the signal is expanded, the amplification factor of said first stage being varied over wider limits than that of said second stages, and means for independently adjusting the signal applied to said stages and to said control circuit.

21. A system for reproducing sound from a sound record comprising a plurality of stages of amplification, each stage including a space discharge amplifier having a control element, an impedance in series with said control elements, said impedance being in part common to all of said stages, a control circuit associated with said impedance for passing a current through said impedance proportional to the strength of the input signal and in a direction such that the potential drop in said impedance opposes the normal negative biases of said control elements, the relationship being such that an increased signal strength decreases the normal negative bias of said control elements and causes an increase in the amplification ratio of the space discharge devices, and variable capacities connected in parallel with said impedance and bearing such relation thereto that the currents passing through said impedance is proportional to the average value of the input signal over a predetermined period of time, and means for independently adjusting the signal applied to said stages and to said control circuit.

22. In a system for reproducing sound, a sound record, a pick-up device therefor, an amplifier fed by said pick-up device, a control circuit fed by said pick-up device for controlling the gain ratio of said amplifier in accordance with changes in signal strength, means for manually adjusting the energy fed to said amplifier, independent means for manually adjusting the energy passed through said control circuit and independent means for manually adjusting the speed of variation of gain ratio with change in signal strength.

23. In a system for reproducing sound from a sound record, amplifying means having a variable gain ratio, means to control said gain ratio in accordance with the signal strength, and means to independently adjust the energy applied to said amplifying means and to said control means.

24. In a system for reproducing sound from a sound record, amplifying means having a variable gain ratio, means to control said gain ratio in accordance with the signal strength, means to adjust the timing of said control circuit. and means to independently vary the energy applied to said amplifying means and to said control means.

JOHN HAYS HAMMOND, Jr.
ELLISON S. PURINGTON.